United States Patent [19]
Spratte et al.

[11] Patent Number: 5,180,910
[45] Date of Patent: Jan. 19, 1993

[54] LIGHT BARRIER WITH RETROREFLECTOR AND OPTICAL MEANS

[75] Inventors: Hans H. Spratte, Kirchheim-Teck; Rudiger Pepperl, Ratingen, both of Fed. Rep. of Germany

[73] Assignee: Leuze Electronic GmbH & Co., Owen-Teck, Fed. Rep. of Germany

[21] Appl. No.: 763,156

[22] Filed: Sep. 20, 1991

[30] Foreign Application Priority Data

Sep. 20, 1990 [DE] Fed. Rep. of Germany ....... 4029766

[51] Int. Cl.$^5$ .................... G01V 9/04; G08B 13/18
[52] U.S. Cl. ................ 250/221; 250/237 G; 340/556
[58] Field of Search ........... 250/221, 222.1, 237 G; 340/555, 556, 557

[56] References Cited

U.S. PATENT DOCUMENTS

| | | | |
|---|---|---|---|
| 3,842,257 | 10/1974 | Köhler | 250/221 |
| 4,155,647 | 5/1979 | Michel | 356/28 |
| 4,339,660 | 7/1982 | Buchholz et al. | 250/221 |
| 4,458,979 | 7/1984 | Röss | 350/3.71 |
| 4,546,246 | 10/1985 | Bechtel | 250/221 |
| 4,563,577 | 1/1986 | Schaller | 340/556 |
| 4,816,667 | 3/1989 | Meinert | 250/221 |
| 4,847,488 | 7/1989 | Müller et al. | 250/221 |
| 4,958,068 | 9/1990 | Pong et al. | 250/222.1 |
| 5,004,908 | 4/1991 | Nakamura | 250/221 |

FOREIGN PATENT DOCUMENTS

| | | | |
|---|---|---|---|
| 0083431 | 7/1983 | European Pat. Off. | 250/221 |
| 1264809 | 2/1972 | United Kingdom | 340/556 |

*Primary Examiner*—David C. Nelms
*Assistant Examiner*—Michael Messinger
*Attorney, Agent, or Firm*—Spencer, Frank & Schneider

[57] ABSTRACT

A reflected light barrier is provided which includes a light source and a transmitting lens located for transmitting light from the light source along a beam path having a transmitting axis. A retroreflector is positioned for receiving the light transmitted by the transmitting lens and retroreflects the transmitted light. A light detector is disposed on the same side of the retroreflector as the light source. A receiving lens having a receiving optical axis is disposed in front of the light receiver for collecting a portion of the retroreflected light and focusing the portion of retroreflected light onto the light detector. The transmitting lens and the receiving lens are arranged next to one another. An optical device is disposed along the beam path between the transmitting lens and the receiving lens for transmitting and redirecting the transmitted and retroreflected light so that an increased portion of retroreflected light is oriented onto the receiving optical axis of the receiving lens.

14 Claims, 3 Drawing Sheets

LIGHT BARRIER WITH RETROREFLECTOR AND OPTICAL MEANS

CROSS REFERENCE TO RELATED APPLICATIONS

The present application claims the rights of priority with respect to application Serial No. P 40 29 766.7 filed Sept. 20th, 1990 in Germany, the subject matter of which is incorporated herein by reference.

BACKGROUND OF THE INVENTION

The present invention relates to a reflected light barrier having a light source, a transmitting lens, a detector and receiving lens on the same side of a retroreflector wherein the transmitting and receiving lens approximately border on one another, as for example disclosed in German Utility Model Patent No. 73/00004.

A drawback in this known reflected light barrier is that the retroreflector reflects only a small portion of power of transmitted light back onto the receiving lens and then to a detector, whereas a major portion of the transmitted light is reflected onto the transmitting lens placed in front of the light transmitter.

When using retroreflectors composed of many small triple prisms in the form of a grid, it is possible to broaden the transmitted light thereby achieving only a small (few millimeters) parallel offset between the transmitted light beams and reflected light.

Since all real retroreflectors have angle errors in their triple prisms as well as other structural flaws, they all cause slight angular deviations between the transmitted light beams and the reflected light beams and, consequently, a certain amount of radiation travels to the detector via the receiving lens. Therefore, a standard approach may be sufficient for applications requiring only minimal return power. Stated more precisely, the light detector can only detect radiation intercepted by the receiving lens, that is, contained in a descending edge of the received radiation.

FIG. 1 shows a double lens reflected light barrier 1 of conventional design, having a light transmitter or light source 10, a transmitting lens 11 disposed in front of light transmitter 10, a retroreflector 12 in the form of a plastic triple mirror, a receiving lens 13 and a light receiver or detector 14 disposed behind receiving lens 13. Transmitted light beams are marked 15 and received light beams are marked 16.

FIG. 2 is a basic plot showing radiation intensity I(x) of received radiation 16 at values x along transmitting lens 11. Only radiation contained in descending edge 17 of received light beam 16 can be collected by receiving lens 13 and detected by detector 14.

Consequently, so-called "two-eyed" or double lens reflection light barriers ar not particularly suitable either for short or for long ranges. Even for medium ranges, only a small fraction of the transmitted power reaches the light receiver after being reflected by the retroreflector.

SUMMARY OF THE INVENTION

Therefore, it is an object of the present invention to improve the efficiency of reflected light barriers by increasing the portion of transmitted radiation which is collected by the receiving lens and detected by the detector, thereby making the reflected light barrier equally well suited for short, medium and long range use.

The above and other objects are accomplished in accordance with the invention by the provision of a reflected light barrier, comprising: a light source for generating light; a transmitting lens located for transmitting light generated by the light source along a beam path having a transmitting axis; a retroreflector positioned for receiving the light transmitted by the transmitting lens and retroreflecting the transmitted light; a light detector disposed on the same side of the retroreflector as the light source; a receiving lens having a receiving optical axis and being disposed in front of the light receiver for collecting a portion of the retroreflected light and focusing the portion of retroreflected light onto the light detector, the transmitting lens and the receiving lens being arranged next to one another; and optical means disposed along an optical path between the transmitting lens and the receiving lens for transmitting and redirecting the transmitted and retroreflected light for increasing the portion of retroreflected light oriented onto the receiving optical axis of the receiving lens.

In accordance with one feature of the invention, the optical means includes a diffraction grating arranged in front of the retroreflector means.

The above and other objects, effects, features, and advantages of the present invention will become more apparent from the following description of embodiments thereof taken in conjunction with the accompanying drawings.

DETAILED DESCRIPTION OF THE PREFERRED EMBODIMENTS

Figure 1:
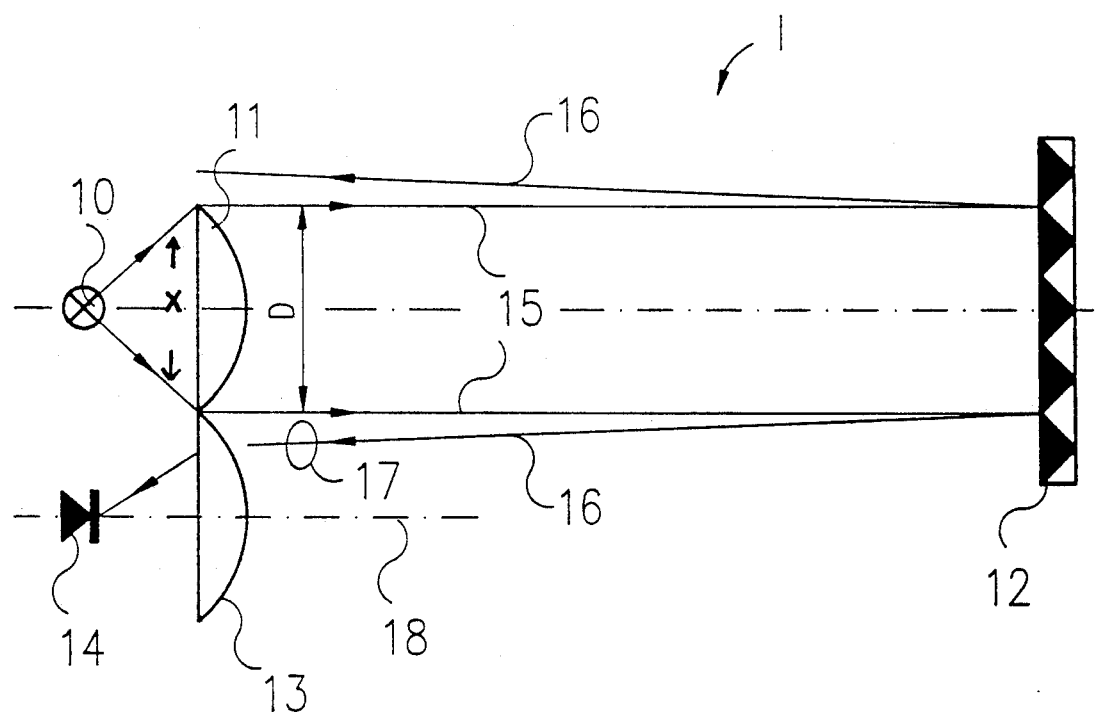
FIG. 1 is a schematic representation of a conventional double lens reflected light barrier.
Figure 2:
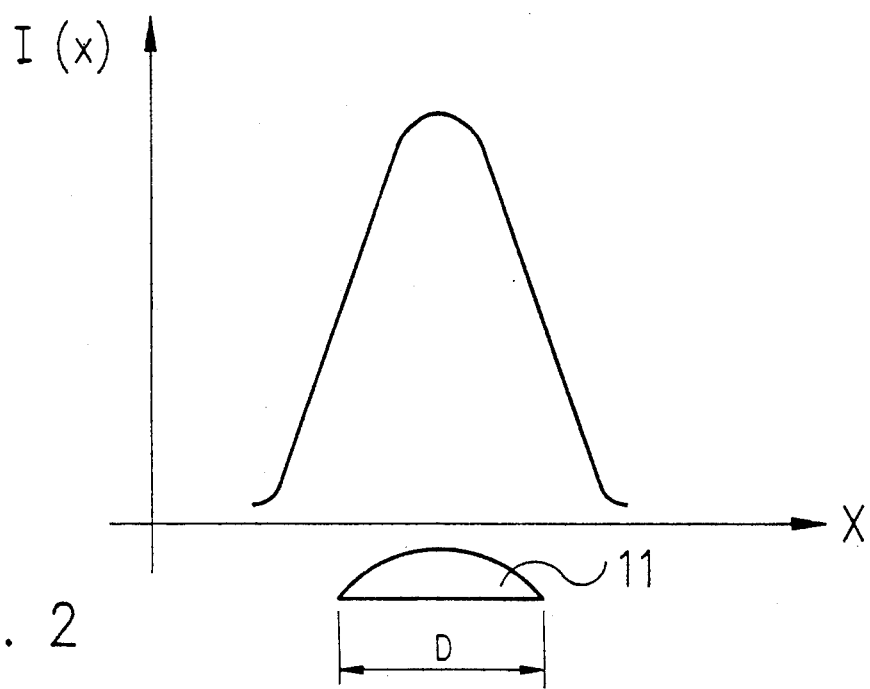
FIG. 2 is a graph which shows the radiation intensity I(x) at transmitting lens 11 of reflected light barrier 1.
Figure 3:
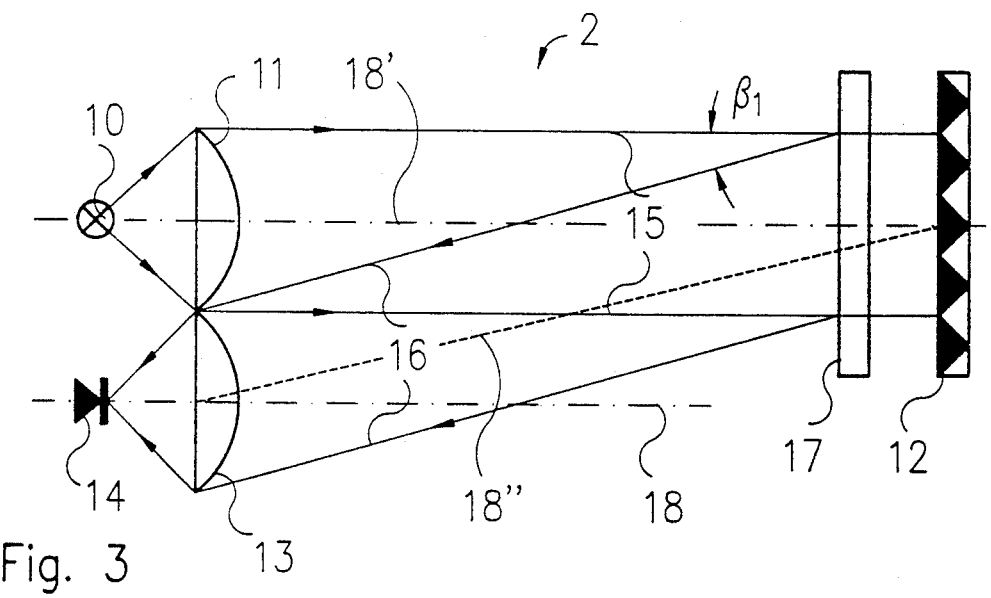
FIG. 3 is a schematic which shows a general view of the invention having optical means 17 which produces an angle offset $\beta_1$ between the transmitted light beam 15 and the received light beam 16.

FIG. 3 shows a reflected light barrier 2 according to the invention. Those elements in FIG. 3 which are the same as in FIGS. 1 and 2 are given the same reference numerals. Optical means 17 deflects a major portion of transmitted light 15 (during or after transmitted light 15 is reflected by retroreflector 12) along receiving axis 18" towards receiving lens 13 disposed next to transmitting lens 11. Offset angle $\beta_1$ is the angle between transmitted light 15 and received light 16 or alternatively the angle between transmitting axis 18' and receiving axis 18". Optical means 17 can be placed apart from retroreflector 12 as shown in FIG. 3 or can be physically connected to or integrated into retroreflector 12 as will be discussed below. Transmitting lens 11 and receiving lens 13 may be juxtaposed or separated from each other depending on the value of offset angle $\beta_1$.

Figure 4A:
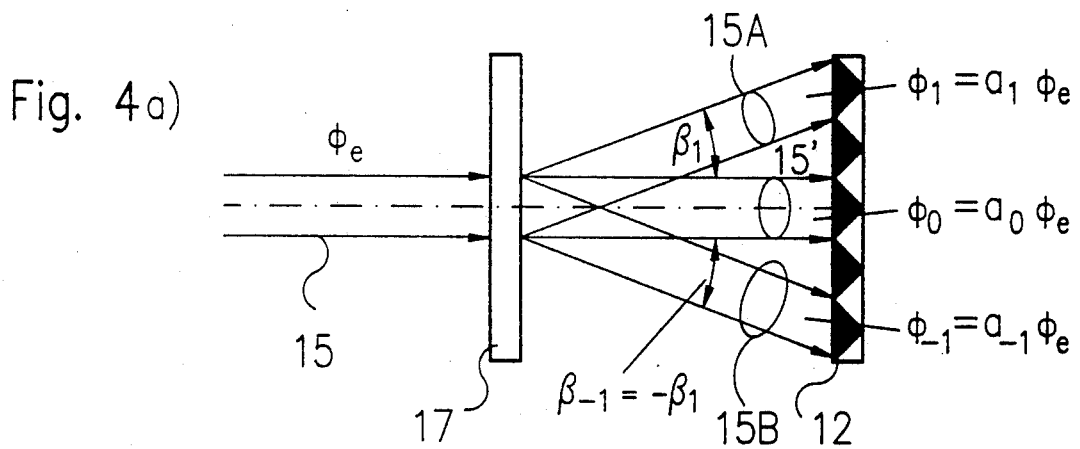
FIGS. 4a and 4b show one embodiment of the invention using a diffraction grating 17A as optical means 17.
Figure 4B:
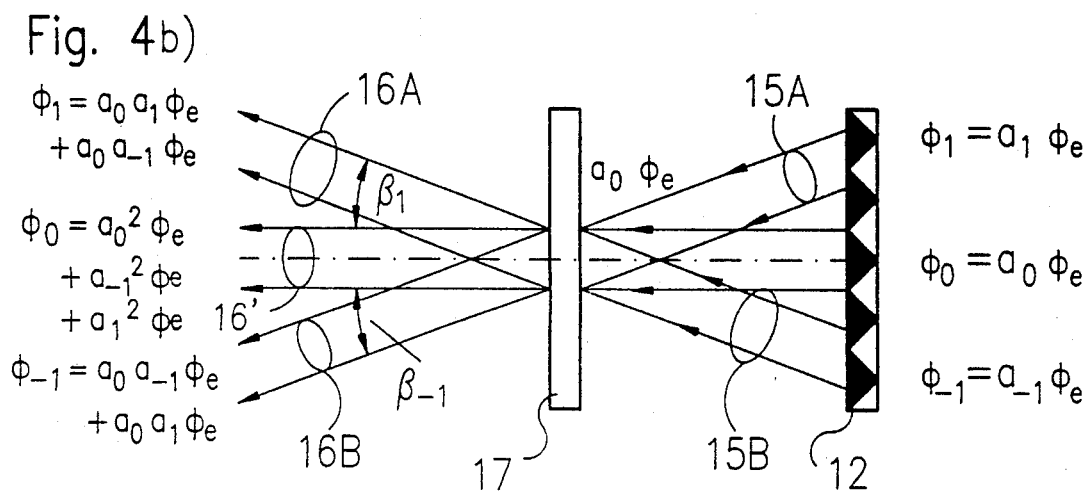

FIGS. 4a and 4b show an embodiment of the invention in which optical means 17 is a diffraction grating 17A. Diffraction grating 17A produces angle offset $\beta_1$ between transmitted light 15 and received light 16. Offset angle $\beta_1$ of reflected light barrier 2 can be chosen to allow transmitting lens 11 and receiving lens 13 to be arranged next to one another while optimizing an output signal from detector 14. As mentioned above, diffraction grating 17A can also be connected to or integrated into retroreflector 12. Finally, diffraction grating 17A can be either an amplitude or phase type diffraction grating, the latter having an additional advantage of being lossless, that is, no light is lost due to absorption.

A diffraction grating can be used as optical means 17 in light barrier 2 in the following manner. In general, if incident parallel light impinges on a diffraction grating, a component $\Phi_0$ thereof passes through the grating with its direction of incidence unchanged. This component is called a zero order diffraction component. In addition, higher order diffraction components are created after the parallel light passes through the diffraction grating. These components each have power $\Phi_n$ and are deflected at the angles $\beta_n$ ($n = \pm 1, \pm 2, ...$) relative to the direction of the incident light where n corresponds to an $n^{th}$ order diffraction component. The power of light in these diffraction components is related to the power of light in the incident light $\Phi$ according to the following equation:

$$\Phi_n = a_n \Phi_e, (n = 0 \pm 1, \pm 2, ...) \quad (1)$$

where $a_n$ are $n^{th}$ order power coefficients. For energy conservation reasons, $$\sum_n a_n = 1 - A, \quad (1a)$$

where A is the absorption coefficient. Absorption coefficient A can be used to determine the amount of incident light absorbed by the diffraction grating (for an ideal phase grating, $A = 0$). Finally, the number of diffraction orders produced as well as the power in each diffraction component is a function of the structure of the period of the diffraction grating.

Relating the above discussion to FIGS. 4a and 4b, transmitted light 15 having power $\phi_e$ passes through diffraction grating 17A before it reaches retroreflector 12 (FIG. 4a) and again after it is reflected by retroreflector 12 (FIG. 4b). retroreflector For small angles of incidence and a coarse grating structure, the following relationship holds between angles of the individual diffraction components and optical axis 18:

$$\beta_n = n\beta_1, n = 0 \pm 1, \pm 2, \quad (2)$$

However, for a fine grating structure and a large angle of incidence, equation (1) must be utilized.

Referring to FIG. 4a, incident transmitted light 15 is divided into diffraction orders $n = 0, +1$, where diffraction grating 17A is a pure phase grating (no absorption). Phase grating 17A is placed immediately in front of retroreflector 12. After passage through phase grating 17A, transmitted light 15 is split into a light component 15' of zero order diffraction, a light component 15A of +1 order diffraction and a light component 15B of −1 order diffraction. Referring to FIG. 4b, after reflection at retroreflector 12, light component 15' of zero order diffraction is again split into a light component 16' of zero order diffraction, a light component 16A of +1 order diffraction and a light component 16B of −1 order diffraction. Light component 16' of zero order diffraction returns to transmitting lens 11, precisely as it would have, had there been no diffraction grating 17A in front of retroreflector 12. Light component 16A of $\pm 1$ order diffraction forms an angle $\beta_1$ with optical axis 18 of transmitting lens 11 and light component 16B of $-1$ order diffraction forms an angle $\beta - 1 = -\beta_1$ with optical axis 18. Light components 16A and/or 16B constitute received light 16 in FIG. 3, that is, light components 16A and/or 16B can be directed toward receiving lens 13 by suitably selecting angle $\beta_1$, which in turn is obtained by suitably selecting the structure of the period of diffraction grating 17A.

Light Components 15A and 15B also have first order diffraction components split by phase grating 17A and consequently also contribute power to light components 16', 16A and 16B. Light component 16' returns to transmitting lens 11 and light components 16A and 16B form angles $+\beta$ and $-\beta_1$, respectively, with optical axis 18. Hence, light components 16A and 16B constitute received light which extends on both sides of optical axis 18 and which could be collected using two receiving lenses on either side of transmitting lens 11.

The power in each of the light components 16A, 16' and 16B, respectively, is the following:

$$\Phi_1 = a_0 a_1 \phi_e + a_0 a_{-1} \phi_e$$
$$\Phi_o = a_0^2 \phi_e + a_1^2 \phi_e + a_{-1}^2 \phi_e \quad (3)$$
$$\Phi_{-1} = a_0 a_{-1} \phi_e + a_0 a_1 \phi_e.$$

The power in the received light components 16A and 16B become a maximum for $a_0 = a_1 = \frac{1}{2}$ and $a_{-1} = 0$. Each received light component 16A and 16B then includes $\frac{1}{4}\phi_e$, i.e., $\frac{1}{4}$ of the power of transmitted light 15. The other half of the power of the transmitted light 15 is reflected back into the transmitting lens 11.

In a two-dimensional cross grating, light beams from various diffraction orders are created and spatially arranged around the transmitted light beam. In this way, received light beams are generated which are spatially arranged around transmitting lens 11. These received light beams can be detected by detector 14, provided receiving lens 13 is appropriately placed around transmitting lens 11.

Figure 5:
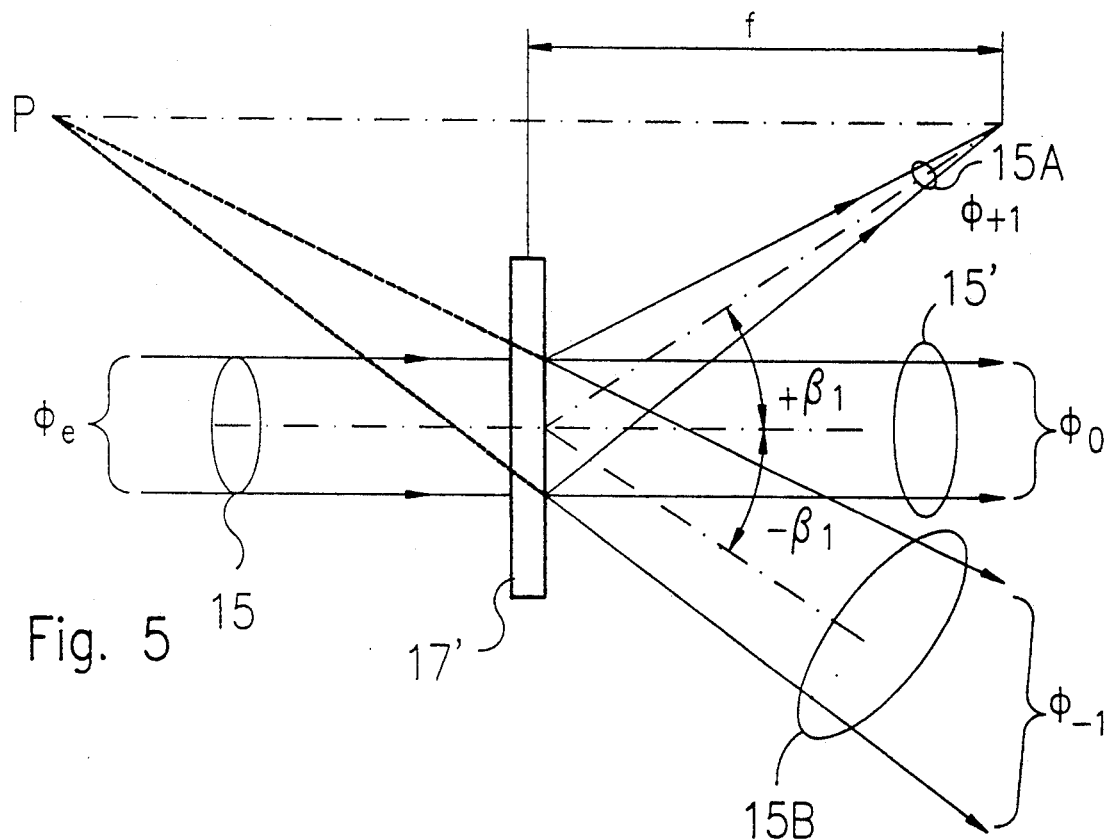
FIG. 5 shows another embodiment of the invention using an off-axis Fresnel zone plate 17B as optical means 17.

Instead of a simple diffraction grating or cross grating, a rotationally symmetrical grating structure may also be employed. FIG. 5 is a schematic representation of the path of transmitted radiation 15 using a Fresnel zone plate 17B as the optical means. The focal depth f of Fresnel zone plate 17B for the +1 order diffraction component 15A is advantageously adapted to the range of the double lens reflected light barrier 2. Such a grating is commonly referred to as a Fresnel zone plate and can be created, for example, using standard holographic methods such as interfering a planar wave with a spherical wave on a hologram plate. In addition to creating a light component of zero order diffraction, a Fresnel zone plate creates a converging light beam (the +1 order diffraction component 15A) and a diverging light beam (the −1 order diffraction component 15B). For use with double lens reflected light barrier 2, off-axis Fresnel zone plate 17B is particularly advantageous when the above-mentioned converging and diverging light beams 15A and 15B are at an angle $\beta 1$ and $(-\beta_1)$, respectively, relative to optical axis 18' of the transmitting lens 13. The operation of this zone plate in a double lens reflected light barrier is analogous to the above-described example of the phase grating. However, here the diverging light 15B of the −1 order diffraction component has the added feature of converging to a point P after reflection from retroreflector 15B.

The fanning of light at a plastic triple prism reflector 12' due to structural flaws in individual plastic triple prisms has been mentioned above. This effect can be intentionally increased by employing a scattering disc as the optical means. Such a scattering disc has a statistically determined phase structure. In particular, by a suitable selection of the phase deviation and of the average diameter of the scattering centers, the shape of the directional characteristic can be adapted to the range of the double lens reflected light barrier. Therefore, instead of creating spatially separated light components of different diffraction orders, a lobe shaped beam characteristic of the transmitted light beam is created.

Since diffraction is an interference phenomenon, optical means 17 must be illuminated by light that is capable of interference (i.e., the light must be at least partially spatially and temporally coherent). In particular, a light emitting diode (LED) can be employed as light source 10 of light barrier 2. If the LED is arranged in the forward focal plane of the transmitting lens, resulting transmitted light 15 will be sufficiently spatially coherent. On the other hand, if lens 11 images the light emitting surface of the LED (light source 10) onto optical means 17, resulting transmitted light 15 may not be sufficiently coherent. The time coherence of the transmitted light 15 is determined by the monochromaticity of the LED.

Figure 6:
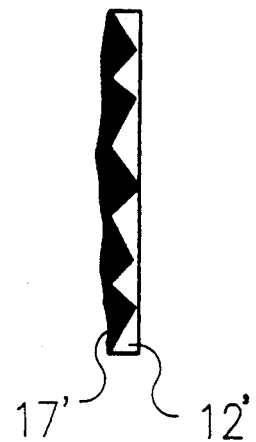
FIG. 6 shows yet another embodiment of the invention using a retroreflector 12' and intentional angle errors 17' as optical means 17.

Finally, it is possible to construct retroreflectors 12, for example, in the form of plastic triple prisms, to have intentional angle errors or other structural flaws in the triple prisms. That is, diffraction grating 17A can be considered to be integrated directly into retroreflector 12. FIG. 6 is a schematic representation of such a retroreflector 12' with angle errors marked 17'.

Optical means 17 (which is any one of 17A, 17B, 17' or a scattering disc) can be produced, for example, using holographic techniques. Synthetic holograms such as, for example, Dammann gratings, can also be used. Finally, methods employed for producing embossed holograms can be used to inexpensively mass produce the plastic elements.

Obviously, numerous and additional modifications and variations of the present invention are possible in light of the above teachings. It is therefore to be understood that within the scope of the appended claims, the invention may be practiced otherwise than as specifically claimed.

What is claimed is:

1. A reflected light barrier, comprising:
    a light source for generating light;
    a transmitting lens located for transmitting light generated by said light source along a beam path having a transmitting axis;
    a retroreflector positioned for receiving the light transmitted by said transmitting lens and retroreflecting the transmitted light;
    a light detector disposed on the same side of said retroreflector as said light source;
    a receiving lens having a receiving optical axis and being disposed in front of said light receiver for collecting a portion of the retroreflected light and focusing the portion of retroreflected light onto said light detector, said transmitting lens and said receiving lens being arranged next to one another; and
    optical means disposed along an optical path between said transmitting lens and said receiving lens for transmitting and redirecting the transmitted and retroreflected light for increasing the portion of retroreflected light oriented onto the receiving optical axis of said receiving lens.

2. A reflected light barrier as defined in claim 1, wherein said optical means comprises at least one diffraction grating which produces an optical angle offset ($\beta_1$) between the transmitting axis and the receiving optical axis.

3. A reflected light barrier as defined in claim 2 wherein said diffraction grating comprises a plate having a complex amplitude structure.

4. A reflected light barrier as defined in claim 2, wherein said diffraction grating comprises a plate having a one-dimensional grating.

5. A reflected light barrier as defined in claim 2, wherein said diffraction grating comprises a plate having a cross grating.

6. A reflected light barrier as defined in claim 2, wherein said diffraction grating comprises a plate having a off-axis Fresnel zone structure.

7. A reflected light barrier as defined in claim 1, wherein said optical means comprises a scattering disc having a phase deviation and an average scattering center diameter selected such that the increased portion of the retroreflected light collected by said receiving lens fully illuminates said receiving lens.

8. A reflected light barrier as defined in claim 2, wherein said diffraction grating comprises a transparent plastic plate having an embossed phase structure.

9. A reflected light barrier as defined in claim 2, wherein retroreflected light collected by said receiving lens serves as an indicator for an engagement direction of an object in a monitoring path of said reflected light barrier.

10. A reflected light barrier as defined claim 2, wherein said diffraction grating is disposed spatially in front of said retroreflector.

11. A reflected light barrier as defined in claim 2, wherein said diffraction grating is a component of said retroreflector.

12. A reflected light barrier as defined in claim 1, wherein said optical means and said retroreflector comprise a single unit having a plurality of triple prism reflectors with intentional angle and structural errors.

13. A reflected light barrier as defined in claim 1, wherein said retroreflector comprises a plastic triple prism reflector.

14. A reflected light barrier, comprising:
    a light source for generating light;
    a transmitting lens arranged optically downstream from said light source for transmitting the light along a transmitting axis;
    optical means arranged optically downstream from said transmitting lens for transmitting and redirecting light and outputting transmitted and redirected light;
    retroreflector arranged optically downstream from said optical means for retroreflecting the transmitted and redirected light back toward said optical means, said optical means transmitting and redirecting the retroreflected light;

receiving lens arranged next to said transmitting lens and having a receiving optical axis for collecting a portion of the retroreflected light and outputting collected light; and detector means placed optically downstream from said receiving lens for detecting the collected light, wherein said optical means redirects the retroreflected light to travel along the receiving optical axis, thereby increasing the portion of the retroreflected light collected by said receiving lens.

* * * * *